United States Patent Office 3,703,562
Patented Nov. 21, 1972

3,703,562
SULFONIC ACID CONTAINING ORGANOPOLY-
SILOXANE COMPOSITIONS
Robert C. Antonen and Gust J. Kookootsedes, Midland, and Arthur J. Field, Bay City, Mich., assignors to Dow Corning Corporation, Midland, Mich.
No Drawing. Filed Mar. 27, 1972, Ser. No. 238,532
Int. Cl. C08f 11/04
U.S. Cl. 260—825
14 Claims

ABSTRACT OF THE DISCLOSURE

Small amounts of aryl-substituted sulfonic acids are added to siloxane resins curable by the platinum catalyzed reaction of $\equiv$SiCH=CH$_2$ with $\equiv$SiH to improve the moisture resistance of the cured resins.

---

The present invention relates to an improved organopolysiloxane resin. More particularly, the invention relates to a solventless liquid resin containing a sulfonic acid additive which, when cured, exhibits resistance to cracking or crazing in the presence of heat and moisture.

Organopolysiloxane resins in which the substituent organic groups are methyl, phenyl, vinyl and/or other hydrocarbon groups are well known. These resins are cured by a variety of mechanisms to form hard infusible materials. Vinyl-functional resins containing a hydrogen-functional siloxane cure by means of the platinum catalyzed addition of $\equiv$SiH to the silicon-bonded vinyl groups; this cure mechanism avoiding the evolution of volatiles. The properties of these organopolysiloxane resins, such as moldabilitty, high dielectric capacity, resistance to thermal decomposition and retention of strength at high temperatures, render them useful in many different applications.

The application of siloxane resins in the field of optics has been limited. Although currently available resins cure without the evolution of void-forming volatiles, the resins lose their clarity after prolonged exposure to moisture. Haziness of the resin results from disc-shape fractures which may be caused by adsorption of free water or by water trapped in the resin matrix. The present invention provides resin compositions which exhibit resistance to cracking and hazing in the presence of moisture.

Thus, it is an object of the invention to provide improved organopolysiloxane compositions.

It is another object of the invention to provide cured organosiloxane resins suitable for use as optical lens or optical coatings.

The objects of the invention will be apparent to one skilled in the art upon consideration of the following disclosure and claims.

Broadly, the invention is directed to curable organopolysiloxane resin compositions which cure without the evolution of volatiles, these organopolysiloxanes containing an aryl-substituted sulfonic acid in an amount sufficient to minimize cracking and hazing of the cured resin upon exposure to moisture. Addition of aryl-substituted sulfonic acids, such as benzenesulfonic acid, to these curable organopolysiloxanes minimizes the micro-fractures which are readily apparent when the unmodified cured compositions are exposed to boiling water.

In a specific embodiment, the invention provides a curable composition consisting essentially of (a) an organopolysiloxane having an average of at least 8 silicon atoms per molecule in which the organic substituents are selected from the group consisting of the methyl, phenyl and vinyl radicals; there being an average of at least one organic substituent per silicon atom in the molecule; the siloxane containing from 15 to 60 mol percent vinyl-functional siloxy units, the phenyl substituents being present in an amount sufficient to provide a phenyl to silicon ratio of from 0.25:1 to 1.75:1, (b) a liquid organopolysiloxane having at least two $\equiv$SiH groups per molecule and at least one radical selected from the group consisting of phenyl, xenyl, 2-phenylpropyl, phenylene and xenylene groups per molecule; any remaining siloxane substituents being methyl radicals; said liquid organopolysiloxane (b) being present in an amount such that the ratio of $\equiv$SiH groups in (b) to the vinyl groups in (a) is in the range of from 0.75:1 to 1.5:1; (c) a platinum catalyst; and (d) from about 0.1 to weight percent based on the total weight of (a) and (b) of an acid selected from the group consisting of sulfonic acids of the formula R'SO$_3$H wherein R' is selected from the group consisting of aryl, alkaryl and aralkyl radicals, R' containing no more than 24 carbon atoms and diphenyl oxide sulfonic acids of the formula

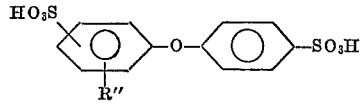

in which R" is an alkyl radical containing from 6 to 18 inclusive carbon atoms.

In the above curable composition, siloxane (a) is the base resin and contains 15 to 60 mol percent of vinyl-functional siloxy units as crosslinking sites. The vinyl-functional siloxy units include monovinylsiloxane, divinylsiloxane, phenylvinylsiloxane, methylvinylsiloxane, divinylmethylsiloxane, divinylphenylsiloxane, vinyldimethylsiloxane, vinyldiphenylsiloxane and vinylphenylmethylsiloxane. The other organo-substituted siloxy units present in the copolymer include monomethylsiloxane, dimethylsiloxane, monophenylsiloxane, diphenylsiloxane, phenylmethylsiloxane, trimethylsiloxane, dimethylphenylsiloxane, diphenylmethylsiloxane, triphenylsiloxane and SiO$_2$ units. It is apparent that the siloxane copolymer (a) can contain R$_3$SiO$_{1/2}$, R$_2$SiO, RSiO$_{3/2}$ and minor amounts of SiO$_2$ units in which R is selected from the group of the defined substituents. While the copolymer contains an average of at least one organic substituent per silicon atom, it is preferred that the degree of substitution (R/Si ratio) be in the range of from 1.2 to 1.8.

In order to obtain desirable physical properties, the copolymeric resin (a) should have an average of at least 8 silicon atoms per molecule. There is no upper limit on the degree of polymerization. The viscosity of the liquid copolymers (a function of the degree of polymerization and the degree of substitution) is generally in the range of from 10,000 to 1 million cs. when measured at 25° C. Of course, solid copolymers can be utilized if desired. Optimal physical properties of the resin also require that the phenyl to silicon ratio be in the range of 0.25:1 to 1.75:1.

Any liquid siloxane containing the requisite $\equiv$SiH groups and aryl or arylene substituents can function as crosslinking agent (b). The defined aryl or arylene functionality provides compatibility with siloxane (a). Siloxane (b) can be linear, cyclic or branched in structure. The hydrogen-functional siloxane can also be used as a diluent to reduce the viscosity of the composition when component (a) is a high viscosity or solid copolymer. Effective dilution is obtained when crosslinker (b) has a viscosity of 2,500 cs. or less at 25° C. Specific examples of liquid organopolysiloxane (b) include

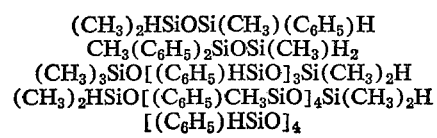

[(CH₃)₂HSiO]₃SiC₆H₅
[(CH₃)₂HSiO]₂Si[OSiC₆H₅(CH₃)₂]₂

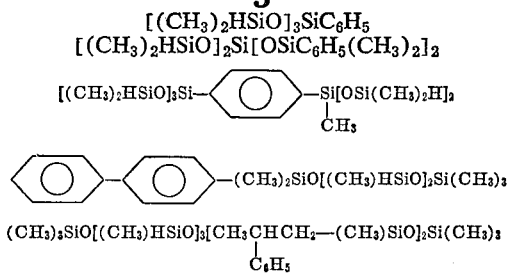

2-phenylpropyltetramethylcyclotetrasiloxane, dimethyldiphenylcyclotetrasiloxane and tetramethyldiphenylcyclotetrasiloxane.

The amount of hydrogen-functional siloxane (b) in the curable composition will vary with the amount of resin component (a) and the vinyl content of (a), but in all cases there is sufficient crosslinked present to provide from 0.75 to 1.5 mol of ≡SiH per mol of vinyl substituents in the mixture. To obtain optimum crosslinking efficiency and superior physical properties, it is preferred that the ratio of ≡SiH to vinyl be in the range of from 0.8:1 to 1.2:1.

The platinum catalyst (c) can be any of the known forms ranging from platinum metal to platinum deposited on carriers, such as silica gel or powdered charcoal; to platinic chloride, salts of platinum and chloroplatinic acid. Any of these forms will function as a catalyst in the curable compositions of the invention. Chloroplatinic acid, either as the commonly available hexahydrate or the anhydrous acid, is a preferred catalyst because of its easy dispersibility in the siloxanes and its lack of effect on the color of the curable compositions. Additional platinum compounds having utility as catalysts include PtCl₂[P(CH₂CH₂CH₃)₃]₂, platinum bromides, a complex a complex of platinous halide and an olefin such as ethylene propylene, butylene, cyclohexane and styrene Pt(CH₃CN)₂Cl, [Pt(CH₃CN)₂(CH₃)₄]Cl₂,
Pt(NH₃)₂Cl₂, K[PtCl₃CH₂CH₂CH₂OH], PtBr₂(C₂H₄)₂,
K[PtBr₃(C₂H₄)], PtCl₂(C₂H₄),(CH₃)₂C=CH₂·PtCl₂,
H₂Pt(CN)₄·5H₂O, H[PtCl₃(CH₃CN)],
Pt(NH₃)₂(CNS)₂, [Pt(NH₃)₄]·[PtCl₄],
[PtCl₂[P(CH₂CH₃)₃]₂]₂, PtCl₂PCl₃, PtCl₂·P(OH)₃,
PtCl₂P(OCH₂CH₃)₃ PtCl₂[P(OCH₂CH₃)₃]₂,
Pt(OOCCH₂SCH₂CH₃)₂, Pt(CN)₃, (CH₃)₄Pt,

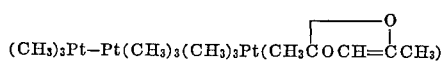

PtCl₂CO and PtBr₂CO.

There should be at least 0.1 part by weight platinum per million parts by weight of the combined total weight of (a) and (b). However, since impurities in the system may readily poison the small quantity of catalyst it is preferred to employ from 1 to 20 parts per million of platinum. A greater amount of platinum does not effect the reaction but economic considerations suggest usage within the mentioned limits.

The aryl-substituted sulfonic acids which are effective to stabilize the compositions in the presence of moisture are those of the formula R'SO₃H in which R' is selected from the group consisting of aryl, alkaryl and aralkyl radicals containing no more than 24 carbon atoms. The R substituents include radicals such as phenyl, benzyl, tolyl, xylyl, 3-ethylphenyl, naphthyl, nonylnaphthyl, octylphenyl and tridecylphenyl.

Thus suitable acids include

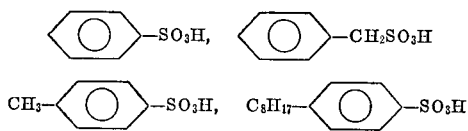

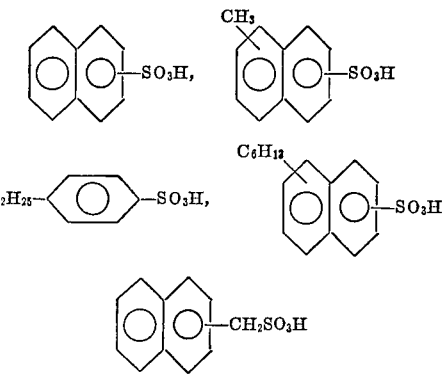

and the like.

The alkyl-substituted diphenyl oxide sulfonic acids useful as stabilizers include

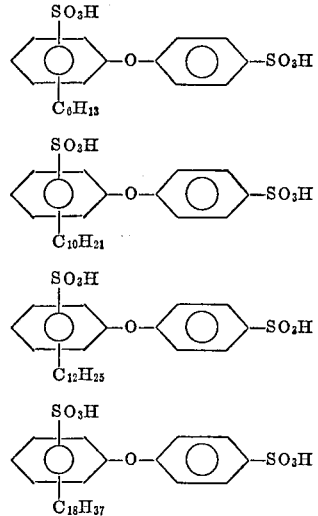

and the like.

These aryl-substituted sulfonic acids and diphenyl oxide sulfonic acids are added in amounts in the range of from 0.05 to 1.5 weight percent based on the total weight of siloxane components (a) and (b). To avoid any detrimental effect to the physical properties of the cured resins, it is preferred to add the minimum amount of acid; this amount generally being less than 0.5 weight percent. The optimum amount will depend upon the composition of the siloxane components and the composition of the particular acid utilized. The effectiveness of a specific amount of acid can be determined by immersing a cured sample of the composition in boiling water for about 30 minutes and then examining the sample for fractures and haziness.

The sulfonic acid-containing compositions of the invention are cured by heating at from about 50 to 200° C. for a period of from a few minutes to 4 hours. Although the mixture of components does have a measurable shelf life, it is preferred that the curable composition be utilized within a few hours of mixing the components.

The curable compositions can be plasticized if desired. Suitable plasticizers include low molecular weight organopolysiloxanes compatible with resin (a) and compatible heat-stable organic materials. The preferred plasticizers are fluid siloxanes having both vinyl and phenyl functionality, for example, divinyldimethyldiphenyldisiloxane and copolymers of methylvinylsiloxy, diphenylsiloxy and trimethylsiloxy units. The phenyl content (at least 15 mol percent) of such fluid siloxanes renders them compatible with resin (a) while the vinyl substituents provide crosslinking sites for immobilization by curing. The plasticizing action is important in those compositions in which the resin (a) is so viscous that the required amount of crosslinker (b) is not sufficient to give an easily handled, flowable material. In those compositions containing a vinyl-siloxane plasticizer, the amount of hydrogen-functional siloxane (b) should be increased so that the amount of ≡SiH relative to the total vinyl content of the resin (a) and plasticizer falls within the range of 0.75:1 to 1.5:1.

When the curable compositions of the invention are to be used in optical applications, it is desirable that the composition be essentially free of ≡SiOH. The resin (a) is the primary source of hydroxyls and can be reacted with alkaline catalysts, such as sodium hydroxide, in a solvent to reduce the hydroxyl content.

Heat stable fillers can be incorporated in these curable compositions. Suitable fillers include glass fibers, finely divided silica, crushed quartz, powdered glass, asbestos, carbon black, and metallic oxides, such as iron oxide, titanium dioxide and magnesium oxide. Other additives, such as pigments, oxidation inhibitors, release agents, can also be utilized.

The compositions of the invention are employed in the conventional manner for coating, molding and impregnating. They are particularly useful are impregnating, encapsulating and potting electrical devices, for coating electrical conductors and as protective coatings for metals and other substrates.

The following examples are intended as illustrative and should not be construed as limiting the invention delineated in the appended claims.

EXAMPLE 1

A solid organosiloxane base resin comprising 25 mol percent $CH_3(CH_2=CH)SiO$ units, the other copolymeric units being $C_6H_5SiO_{3/2}$, $(C_6H_5)_2SiO$ and $(CH_3)_2SiO$, having a phenyl to silicon ratio of about 1:1, and a silicon-bonded hydroxyl content of less than 0.1 weight percent was mixed with sufficient crosslinker of the Formula $C_6H_5Si[OSi(CH_3)_2H]_3$ having a viscosity of 2.0 cs. at 25° C. to provide 1.1:1 moles of ≡SiH per mol of ≡SiCH=CH$_2$. A solution of 0.483 gram of toluene sulfonic acid in 70 grams of toluene was mixed with 243 grams of the two component composition. After mixing, the solvent was removed by vacuum stripping to obtain a composition containing 0.2 percent by weight of toluene sulfonic acid. Five parts of the acid-containing composition were mixed with one part of a platinum-containing liquid resin. The resin consisted of about 30 mol percent $CH_3(CH_2=CH)SiO$, 20 mol percent $C_6H_5SiO_{3/2}$, 36 mol percent $(C_6H_5)_2SiO$ and 14 mol percent $(CH_3)_2SiO$ units, having less than 0.1 weight percent silicon-bonded hydroxyl content and having a viscosity of 441,512 cs. at 25° C. The fluid resin contained about 0.96 weight percent of platinic chloride solution (0.44 percent Pt). Thus, the curable composition contained 0.166 weight percent toluene sulfonic acid and 0.16 weight percent platinum catalyst (7 p.p.m. Pt).

The catalyzed composition was transfer molded at 177° C. for one minute to form one inch-diameter by 0.125 inch-thick discs. The molding conditions were sufficient to partially cure the composition. The partially cured disc was immersed in boiling water for 30 minutes. The boiled disc retained its translucency and when examined with a microscope at 100×, fracturing was not observed. Other discs were postcured at 200° C. for about 65 hours, then immersed in boiling water for 30 minutes and examined. The post-cured samples retained their clarity and showed no evidence of microfractures.

A similar composition in which the sulfonic acid was omitted was molded and tested in the same manner. Initially a clear resin, after being immersed in boiling water for 30 minutes, the discs changed to a very opaque, almost white, material.

In a third composition based on the same components, the toluene sulfonic acid content was reduced to 0.08 weight percent. When molded and immersed in boiling water as described before, this resin turned hazy but not opaque. When post cured for 2 hours at 177° C. the disc turned only slightly hazy after 30 minutes in boiling water and showed no fractures. Thus, at very low concentrations, the aryl sulfonic acid gives significant improvement.

EXAMPLE 2

For purposes of comparison, a composition similar to that of Example 1 was formulated containing 0.15 weight percent sulfuric acid instead of the sulfonic acid. The composition was transfer molded at 177° C. for one minute to form the one inch discs. As-molded discs turned hazy and showed fractures after being immersed in boiling water for 30 minutes. Post-curing for 2 hours at 177° C. gave no improvement in the resin's resistance to the effects of moisture. This example demonstrates that sulfuric acid is not equivalent to the arylsulfonic acids contemplated by the invention.

EXAMPLE 3

Dodecylbenzene sulfonic acid was substituted for toluene sulfonic acid in the catalyzed resin/crosslinker composition described in Example 1. After molding, disc-shaped samples were immersed in boiling water and retained their clarity without any fracturing. Samples which were post cured for 2 hours at 177° C. were also subjected to the boiling water test and retained their clarity. The cured material was especially suitable as a lens for light emitting semiconductor devices.

Octylbenzene sulfonic acid and tridecylbenzene sulfonic acid were substituted for toluene sulfonic acid in the composition of Example 1. The acids were added in amounts sufficient to provide 0.2 weight percent acid in the compositions. The cured materials retained their clarity when immersed in boiling water.

EXAMPLE 4

A diphenyl oxide sulfonic acid,

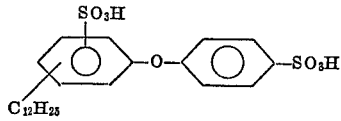

was added to portions of acid-free catalyzed resin/crosslinker compositions described in Example 1. Compositions containing 0.2 weight percent, 0.1 weight percent and 0.05 weight percent of the acid were prepared. All the compositions were molded and cured in the previously described manner. All of the cured resins were clear and the materials containing 0.2 and 0.1 weight percent acid retained their clarity after being immersed in boiling water for 30 minutes. The resin containing 0.05 weight percent acid exhibited very slight haziness after being immersed in boiling water.

EXAMPLE 5

Dodecylbenzene sulfonic acid was utilized in combination with various catalyzed resin/crosslinker compositions. In all of the compositions, the acid was present in an amount in the range of 0.3 to 0.33 weight percent and sufficient chloroplatinic acid was added to provide 11 p.p.m. platinum. The resin/crosslinker formulations were:

(A) 100 grams of resin comprising 20 mol percent $CH_3SiO_{3/2}$, 25 mol percent $C_6H_5SiO_{3/2}$, 20 mol percent $C_6H_5(CH=CH)SiO$ and 35 mol percent $C_6H_5(CH_3)SiO$ mixed with 23.7 grams of fluid siloxane comprising 33.3 mol percent $C_6H_5SiO_{3/2}$ and 67.7 mol percent $(CH_3)HSiO$;

(B) 100 grams of resin comprising 60 mol percent $C_6H_5(CH_3)SiO$, 35 mol percent $C_6H_5(CH_2=CH)SiO$ and 5 mol percent $C_6H_5(CH_3)(CH_2=CH)SiO_{1/2}$ mixed with 37.7 grams of fluid siloxane comprising 33.3 mol percent $C_6H_5SiO_{3/2}$ and 67.7 mol percent $(CH_3)_2HSiO$;

(C) 105.5 grams of resin comprising 45 mol percent $C_6H_5SiO_{3/2}$, 20 mol percent $CH_3(CH_2=CH)SiO$, 30 mol percent $(CH_3)_2SiO$ and 5 mol percent $(CH_3)_3SiO_{1/2}$ and a $CH_3(C_6H_5)SiO/CH_3(CH_2=CH)SiO$ plasticizer mixed with 4.0 grams of siloxane fluid comprising 66.7 mol percent $(CH_3)_2HSiO_{3/2}$, 11.1 mol percent $(CH_3)_2SiO$ and 11.1 mol percent $(CH_3)_{3/2}SiO_{1/2}$;

(D) 100 grams of resin comprising 15 mol percent $CH_3SiO_{3/2}$, 30 mol percent $C_6H_5SiO_{3/2}$, 20 mol percent $CH_3(CH_2=CH)SiO$, $(CH_3)_2SiO$ and $(CH_3)_3SiO_{1/2}$ mixed with 22.8 grams of siloxane fluid having five $(CH_3)HSiO$ units and one

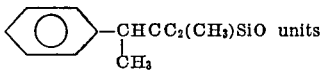

For purposes of comparison, equivalent catalyzed compositions in which the acid was omitted were formulated. After mixing, air was removed under vacuum and the compositions were molded as described in the previous examples. After post-curing for two hours at 175° C., the molded discs were immersed in boiling water for 30 minutes. Observations of the clarity of tested samples are listed below:

| Composition: | Weight percent acid present in composition | Appearance after immersion in boiling water |
|---|---|---|
| A | 0 | Hazy/opaque, many fractures. |
| A | 0.30 | No haze, no fractures. |
| B | 0 | Hazy/opaque, many fractures. |
| B | 0.3 | No haze, no fractures. |
| C | 0 | Slightly hazy, many fractures. |
| C | 0.33 | No haze, no fractures. |
| D | 0 | Slightly hazy, many fractures. |
| D | 0.30 | No haze, no fractures. |

These data show that the acids are effective in a variety of resin/crosslinker compositions.

Reasonable modification and variation are within the scope of the invention which is directed to novel moisture resistant organopolysiloxane compositions.

That which is claimed is:

1. A curable composition consisting essentially of
(a) an organopolysiloxane having an average of at least 8 silicon atoms per molecule in which the organic substituents are selected from the group consisting of the methyl, phenyl and vinyl radicals; there being an average of at least one organic substituent per silicon atom in the molecule; the siloxane containing from 15 to 60 mol percent vinyl-functional siloxy units, the phenyl substituents being present in an amount sufficient to provide a phenyl to silicon ratio of from 0.25:1 to 1.75:1;
(b) a liquid organopolysiloxane having at least two ≡SiH groups per molecule and at least one radical seelcted from the group consisting of phenyl, xenyl, 2-phenylpropyl, phenylene and xenylene groups per molecule; any remaining siloxane substituents being methyl radicals; said liquid organopolysiloxane (b) being present in an amount such that the ratio of ≡SiH groups in (b) to the vinyl groups in (a) is in the range of from 0.75:1 to 1.5:1;
(c) a platinum catalyst; and
(d) from about 0.05 to 1.5 weight percent based on the total weight of (a) and (b) of an acid selected from the group consisting of sulfonic acids of the formula $R'SO_3H$ wherein $R'$ is selected from the group consisting or aryl, alkaryl and aralkyl radicals, $R'$ containing no more than 24 carbon atoms; diphenyl oxide sulfonic acids of the formula

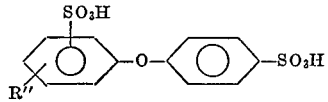

in which $R''$ is an alkyl radical containing from 6 to 18 inclusive carbon atoms; and mixtures thereof.

2. The composition of claim 1 wherein the organopolysiloxane (a) has an average of from 1.2 to 1.8 organic substituents per molecule, 3. The composition of claim 1 wherein the acid (d) is present in an amount no greater than 0.5 weight percent.

4. The composition of claim 3 wherein the acid (d) is of the formula $R'SO_3H$.

5. The composition of claim 4 wherein the acid is toluene sulfonic acid.

6. The composition of claim 4 wherein the acid is dodecylbenzene sulfonic acid.

7. The composition of claim 3 wherein the acid is of the formula

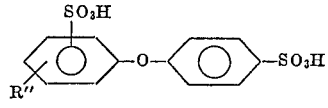

8. The composition of claim 7 wherein $R''$ is a $-C_{12}H_{25}$ radical.

9. The composition of claim 1 wherein the organopolysiloxane (a) contains methylvinylsiloxy units as the vinyl-functional siloxy units.

10. The composition of claim 1 wherein the organopolysiloxane (b) has a viscosity in the range of from 10,000 cs. to 1 million cs. at 25° C.

11. The composition of claim 1 wherein the organopolysiloxane (b) contains at least one phenyl group per molecule.

12. The composition of claim 11 wherein the organopolysiloxane (b) contains at least two dimethylhydrogensiloxy units.

13. The cured composition of claim 1.

14. The composition of claim 1 wherein the platinum catalyst is present in an amount in the range of from 0.1 to 20 parts by weight per million parts by weight of siloxanes (a) and (b).

References Cited

UNITED STATES PATENTS 3,453,234   7/1969   Kookootsedes _____ 260—46.5

DONALD E. CZAJA, Primary Examiner

M. I. MARQUIS, Assistant Examiner

U.S. Cl. X.R.

117—161 ZA; 260—37 SB, 45.7 S, 45.9 S, 46.5 P, 46.5 G, 46.5 UA